United States Patent [19]
May

[11] 3,875,909
[45] Apr. 8, 1975

[54] PROCESS AND APPARATUS FOR SCAVENGING THE SWIRL COMBUSTION CHAMBER OF TWO-STROKE CYCLE INTERNAL COMBUSTION ENGINES

[75] Inventor: Michael G. May, Rolle, Switzerland

[73] Assignee: Yamaka Hatsucloki Kabushiki Kaisha, Shizuoka, Japan

[22] Filed: Mar. 20, 1973

[21] Appl. No.: 342,974

[30] Foreign Application Priority Data
Mar. 20, 1972 Germany............................ 2213329
July 5, 1972 Germany............................ 2232898

[52] U.S. Cl........................ 123/65 WA; 123/191 S
[51] Int. Cl............................................ F02b 19/08
[58] Field of Search............123/30 D, 73 E, 65 W, 123/65 WA, 32 SP, 65 R, 191 S

[56] References Cited
UNITED STATES PATENTS

| | | | |
|---|---|---|---|
| 1,555,809 | 9/1925 | Burtnett | 123/191 S |
| 1,973,876 | 9/1934 | Meyer | 123/65 WA |
| 3,304,922 | 2/1967 | Hideg | 123/32 SP |
| 3,456,627 | 7/1969 | Spiers et al. | 123/32 SP |
| 3,683,868 | 8/1972 | Panhard | 123/191 S |
| 3,754,535 | 8/1973 | Hofbauer | 123/32SP |

Primary Examiner—Manuel A. Antonakas
Attorney, Agent, or Firm—Edwin E. Greigg

[57] ABSTRACT

A process and apparatus in accordance with which the swirl combustion chamber of a two-stroke cycle internal combustion engine is effectively scavenged. Each of the engine cylinders includes a working chamber with at least one gas inlet port and at least one outlet port, a swirl combustion chamber and a flow aperture through which the swirl combustion chamber communicates with the working chamber. The flow aperture is formed so that it has at least one primary partial region and at least one secondary partial region. A portion of the main scavenging stream established in the working chamber is then split-off and redirected through the at least one primary partial region into the swirl chamber. The exhaust from the swirl chamber is through the at least one secondary partial region.

40 Claims, 11 Drawing Figures

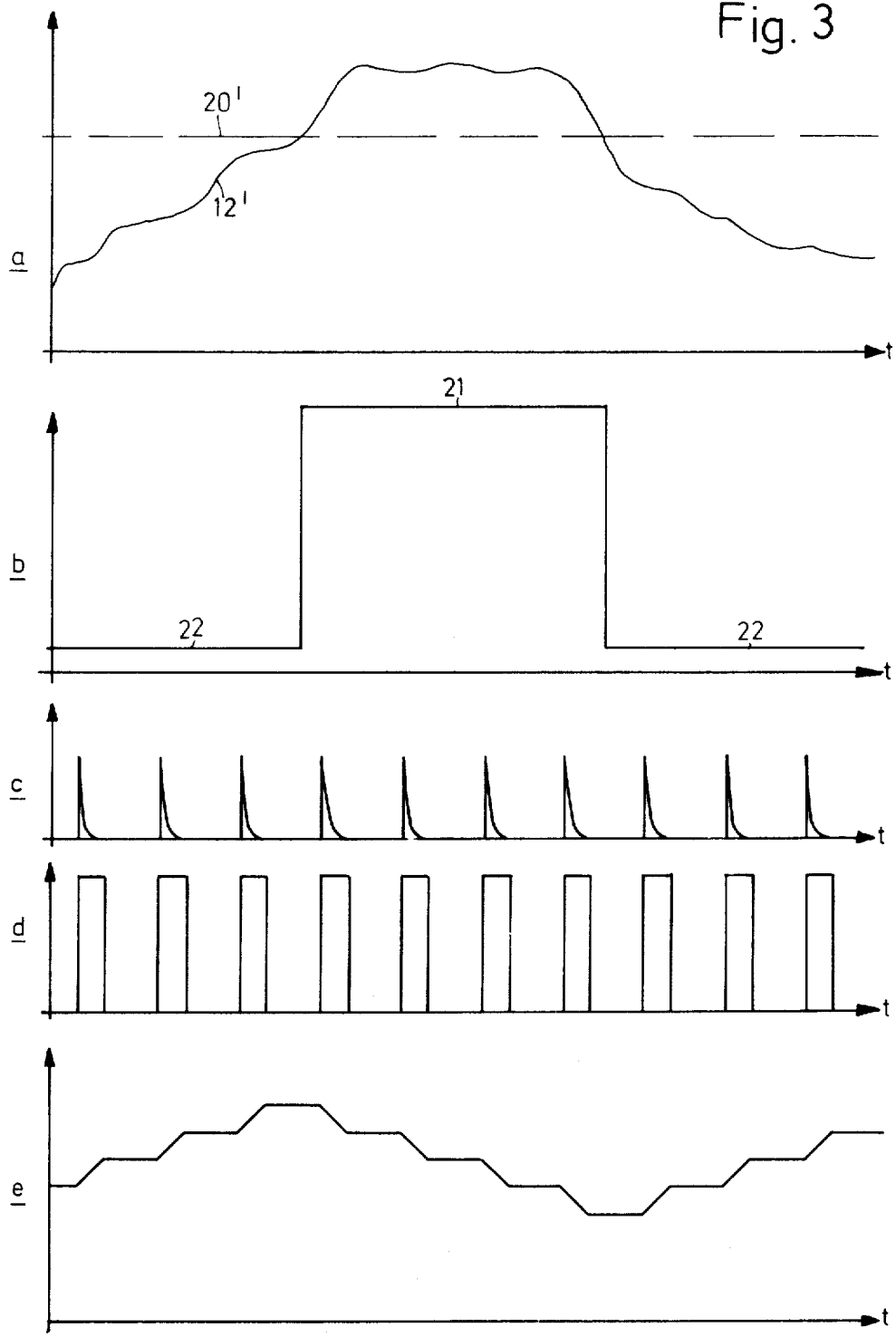

3,875,907

EXHAUST GAS COMPOSITION CONTROL SYSTEM FOR INTERNAL COMBUSTION ENGINES, AND CONTROL METHOD

CROSS REFERENCE TO RELATED PATENTS AND APPLICATIONS

U.S. Pat. No. 3,483,851, Reichardt, Dec. 16, 1969; U.S. Pat. No. 3,745,768, Zechnall et al., July 17, 1973; U.S. Pat. No. 3,759,232, Wahl et al.; and U.S. Pat. No. 3,782,347, Schmidt et al.

The present invention relates to a method and a system to decrease the noxious components in the exhaust emission of internal combustion engines, and more particularly to such a system and method which uses an integral controller, which controls the relative proportion of mass of air and fuel being applied to the internal combustion engine.

Air-fuel controllers, which may be a carburetor or a fuel injection system to control the relative proportion of the mixture being applied to the internal combustion engine can be so arranged that the mixture is variable, the variation of the composition being under control of a control signal derived from an exhaust emission sensor. The control of the mixture may be termed a λ-control, in accordance with terminology referred to and explained in the cross referenced applications; as explained, the air number λ is defined to have a value of 1.0 when the air-fuel mass ratio is the stoichiometric value for perfect combustion, in the case of gasoline and air about 14.4:1. An exhaust emission sensor is placed in sensing relationship with the exhaust gases of the internal combustion engine, the sensor providing an output signal to the mixing device which, in dependence on the output signal regulates the relative proportion of fuel and air being applied to the internal combustion engine, for example by increasing, or decreasing the amount of fuel with respect to air. Change in the mass ratio of the air-fuel mixture to control the exhaust gases can be done by any well known device; in case of a carburetor, a jet setting can be opened or closed, and in case of a fuel injection system, the opening times of the fuel injection valves can be varied.

Controllers which control the mass ratio of the air-fuel mixture applied to the internal combustion engine preferably have integrating characteristics, so that, if the composition of exhaust gases deviates from a predetermined command value for a longer period of time, the correction signal being applied to the mixing device, and hence the correction by the mixing device will be greater, the longer the deviation persists. Such known control devices with integrating characteristics have the disadvantage that the integrating constant of the integrating controller is independent of engine speed. There is a delay in the response of the control loop formed by the exhaust sensor, the control circuitry, the mixing device which changes the mass ratio of the air-fuel mixture, and, particularly, the time that the mixture, as modified, takes as it is applied to the engine. Before any change in the air-fuel mixture is sensed by the sensor, four strokes of the internal combustion engine (assuming a four-cycle engine) must elapse before the exhaust sensor in the exhaust system of the internal combustion engine can sense a change in the composition of the exhaust gases. If, for example, the integrating time constant of the integral controller is set for optimum response at an average speed of the internal combustion engine, then, when the speed of the internal combustion engine is low, the integration of the controller will be too rapid, due to the longer time of the portion of the control loop, taken by the fuel-air mixture through the internal combustion engine; this results in over-correction of the mass ratio of the fuel-air mixture and a consequent overshoot, with an undesired substantial deviation in the other direction from the command value. At high speeds of the engine, the controller however reacts too slowly and the desired command value is reached only slowly.

It is an object of the present invention to provide a system, and a method to decrease the noxious components in the exhaust emission of internal combustion engines which is so arranged that the correction of the mass ratio, that is, of the composition of the air-fuel mixture applied to the internal combustion engine is carried out rapidly, regardless of operating speed of the engine. The system should, additionally, be sturdy, inexpensive, and use as much of existing circuitry and components and control signals as may be available within the engine system already.

SUBJECT MATTER OF THE PRESENT INVENTION

Briefly, the integrating rate of the integral controller is changed as a function of engine speed; in accordance with a preferred form of the invention, a periodically recurring signal is obtained, in synchronism with engine speed, the controller integrating in accordance with this periodically recurring signal.

The invention will be described by way of example with reference to the accompanying drawings, wherein:

FIG. 3 is a series of graphs, to the same time scale, illustrating operation of the system of the present invention and useful in connection with explanation thereof.

Figure 1:
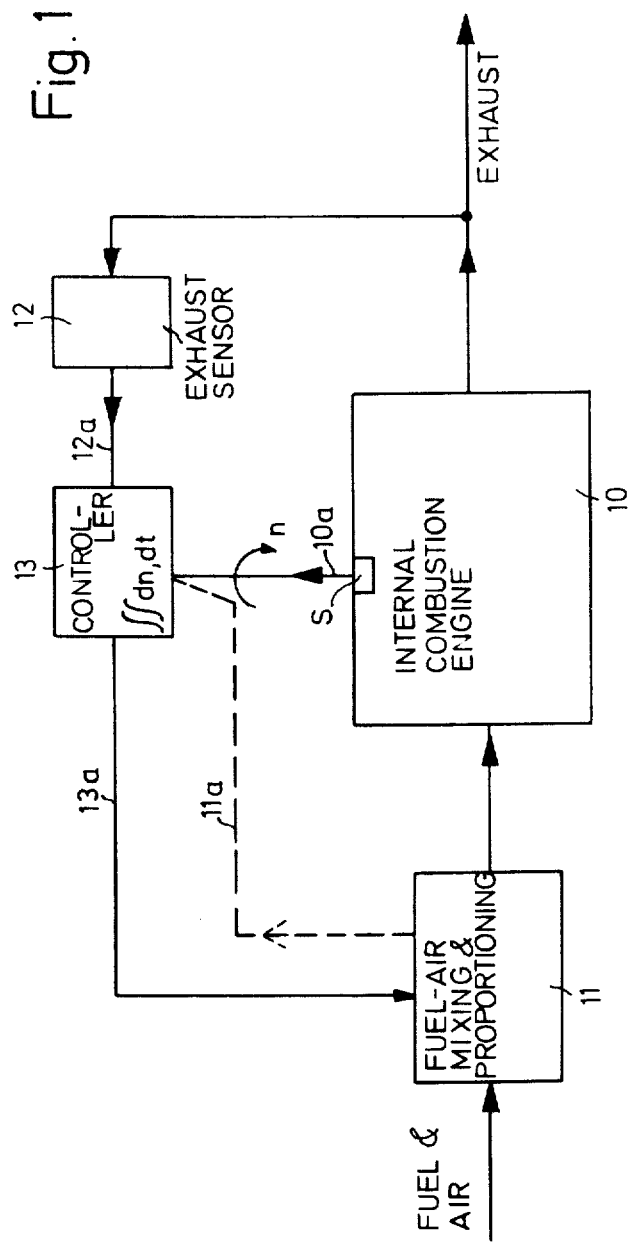
FIG. 1 is a schematic block diagram of the system of the present invention.

An internal combustion engine 10, shown only schematically, has a speed transducer S, such as in tachometer generator, which provides an output signal at a line or terminal 10a, representative of the speed $n$ of the engine. Fuel-air mixture is applied over a fuel-air mixing and proportioning device 11, to which fuel and air are applied, separately, the device 11 mixing the fuel and air and setting the relative proportion, that is the mass ratio thereof to a predetermined value. The exhaust from the engine 10 has an exhaust sensor 12 located in sensing relation thereto which provides an output signal over line 12a to an integral controller 13. In accordance with the present invention, the integral controller 13 is responsive to integrate at a rate which depends on the speed $n$, and, therefore, the speed terminal 10a is also connected to controller 13. The output of controller 13, available at line 13a is applied to the fuel-air mixing and proportioning device 11. A feedback line 11a is connected from the fuel-air mixing and proportioning device 11 back to the controller 13 to provide a closed loop; the feedback line and the closed loop control is not necessary and therefore line 11a is shown as a broken line.

Controller 13 so controls the mixing and proportioning device 11 that the exhaust gases sensed by sensor 12 have a minimum of noxious components. Controller 13 controls the device 11 in steps, or in periodically recurring pulses, the repetition rate of the pulses being determined by a signal derived from speed transducer S, and representative of engine speed. Such a signal can be obtained, for example, from the ignition system of the internal combustion engine. If device 11 is a fuel injection system, then a signal which is speed dependent and triggers the fuel injection events, may also be used. This periodically recurring, step integration provides a predetermined change of the proportioning of fuel and air for the fuel-air mixture for each working stroke of the internal combustion engine. Thus, with respect to unit time, the integration time constant of controller 13 changes automatically and fits to the instantaneous speed of the internal combustion engine. This speed matching is obtained practically without delay. The amplitude of the remaining control swings are effectively the same for any operating cycle of the internal combustion engine, and thus will, likewise, be matched to the speed of the internal combustion engine so that the control loop can be set for optimum response regardless of engine speed.

Figure 2:
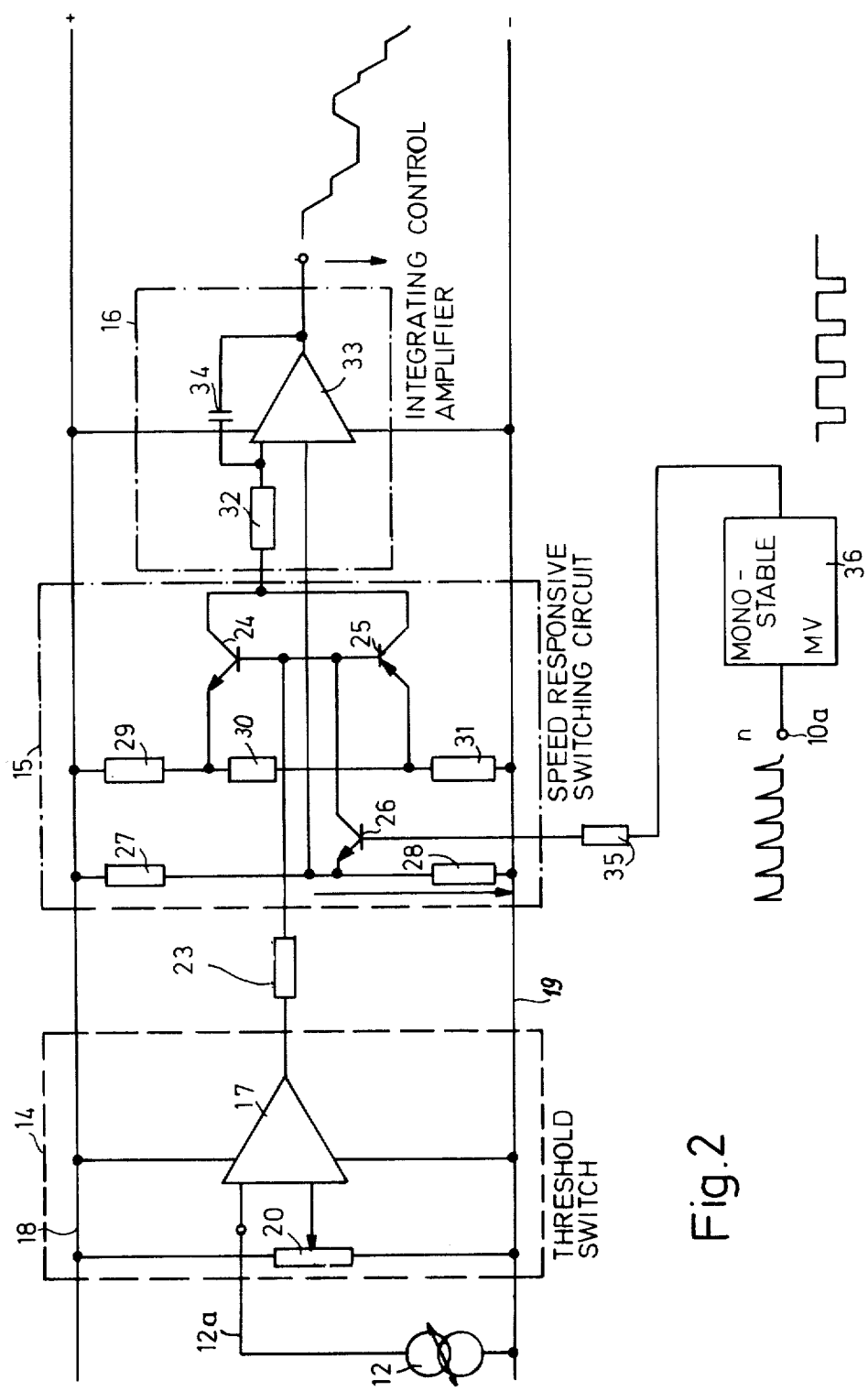
FIG. 2 is a schematic diagram and circuit diagram of the system in accordance with the present invention.

FIG. 2 illustrates an embodiment of the controller 13 which controls the relative proportioning of the air and fuel components of the mixture being applied to the engine in steps. The period of the stepwise change is controlled by a speed signal.

Controller 13 includes threshold switch 14, a speed responsive switching circuit 15 and an integrating control amplifier 16. The threshold switch 14 has as its active element an operational amplifier 17. One input of operational amplifier 17 is connected to a threshold comparison voltage, obtained from a voltage divider formed by a potentiometer 20 which is connected across positive and negative buses 18, 19. The tap point, or slider of the potentiometer 20 is connected to the operational amplifier 17. The second input of the operational amplifier 17 is connected to the output of the exhaust gas sensor 12. A suitable exhaust gas sensor is an oxygen ion sensor. The output voltage, with respect to time, derived from the exhaust gas sensor 12 is shown in graph a of FIG. 3, at curve 12'. The broken line 20' of graph a FIG. 3 illustrates the threshold level set by the potentiometer 20. The output voltage from the operational amplifier is shown in graph b. So long as the voltage from sensor 12 is below the threshold level 20', the output voltage of the operational amplifier 17 will be at the low level indicated by curve 22. As soon as the threshold limit 20' is exceeded, the output voltage of operational amplifier 17 jumps to the high level 21. When the voltage drops, the output voltage of operational amplifier 17 again drops to the low level 22. The output signal will thus be a digital signal.

The output of operational amplifier 17, that is, the output of threshold switch 14 is connected over a resistor 23 to the bases of two transistors 24, 25. The transistors 24, 25 are complementary. The speed responsive switching circuit 15, of which transistors 24, 25 are a part further includes switching transistor 26, the emitter of which is connected to the tap point of a voltage divider formed of resistors 27, 28 and connected across buses 18, 19. The output electrode of switching transistor 26 is connected to the bases of transistors 24, 25. The emitters of the transistors 24, 25 are each connected to a tap point of a voltage divider formed of resistors 29, 30, 31 and connected across the buses 18, 19. The emitter of transistor 24 is connected to the junction of resistors 29, 30 and the emitter of transistor 5 is connected to the junction of resistors 30, 31. The collectors of the two transistors 24, 25 are connected together and further connected over a coupling resistor 32 to the first input of an operational amplifier 33 forming part of the integrating controller 16. An integrating capacitor 34 is connected between the output of operational amplifier 33 and the input to which also resistor 32 is connected, to provide the integrating effect of the operational amplifier 33. The second input of operational amplifier 33 is connected to the tap point of the voltage divider formed by resistors 27, 28 in the speed responsive switching circuit 15. The output of operational amplifier 33 has a correction voltage appear thereat which is used to control the fuel-air mixing and proportioning device 11. If the mixing and proportioning device 11 is a carburetor, then the output voltage from integrating controller 16 can be used to change the setting of a jet, for example by controlling a small motor to turn a needle valve, or to control a solenoid to change the position of a plunger which controls a needle valve, so that the mass ratio of the air-fuel mixture being applied to the engine will be changed. If device 11 is, for example, a fuel injection system then the output voltage can be applied to control a resistor, for example by controlling the resistance of a transistor, or control a motor which turns a potentiometer to change a resistance, the variable resistance being included within the electronic control circuitry of the fuel injection system to change the opening time of the injection valve. Thus, by changing the output voltage of operational amplifier 33, the opening time of the fuel injection valves, and hence the amount of fuel being applied for a given amount of air can be changed, thereby changing the mass ratio of the mixture being applied to the internal combustion engine.

Switching transistor 26 of the speed responsive switching circuit 15 is controlled over a resistor 35 which is connected to the output of a monostable multivibrator (MMV) 36. MMV 36 is triggered by a speed signal, that is, by a periodically recurring signal applied at terminal 10a, derived from the engine. This speed signal is generated by the speed signal generator S which, for example, may be an element coupled to the ignition system of the internal combustion engine 10; or it may be a tachometer generator which rotates in synchronism with the engine main shaft, cam shaft, or crank shaft, and which may already be provided to be used to control a fuel injection system. However derived, the pulses applied at terminal 10a, and recurring at the rate determined by the speed n of the engine are applied to MMV 36. The pulses applied to MMV 36 are seen in FIG. 3, graph c, the MMV providing output pulses as seen in graph d. These pulses will all have the same pulse widths; the pulse spacing, that is the pulse repetition rate will depend on engine speed. The pulses control the output signal derived from the operational amplifier 33 for periodic, stepped correction of the mass ratio of the air-fuel mixture being applied to the internal combustion engine, as seen in graph e of FIG. 3.

Operation: let it be assumed that transistor 26 blocks, since the output voltage of the MMV 36 is smaller than the voltage applied over resistor 28 to the emitter of transistor 26. If the value of the operational amplifier 17 is that indicated by the curve portion 21 (graph b, FIG. 3), that is, is positive, then transistor 24 will have the collector-base diode portion in conductive state and resistance 32 will have current flowing thereover which is connected to the first input of operational amplifier 33. The feedback capacitor 34 connected to operational amplifier 33 causes integration, and the output voltage of operational amplifier 33 will change linearly. When then the output signal of the MMV changes, so that the switching transistor 26 becomes conductive, the base voltage of transistors 24, 25 will be placed at a value which is halfways between the respective emitter voltages, thus causing the transistors 24, 25 to block. No current will flow over resistor 32 to the input of the operational amplifier 33, and integration is interrupted. The output voltage of the operational amplifier 33 will remain at the then obtaining value for so long until one or the other of the transistors 24, 25 will again be conductive, which can occur only when switching transistor 26 again blocks. Integration will then proceed in the one, or in the other direction, so that the correction signal at the output of operational amplifier 33 increases or decreases.

Switching transistor 26 is changed between blocked and conductive state by the MMV 36 which, in turn, is controlled to periodically switch over in dependence on engine speed. Each pulse signal, for example each ignition signal or each injection pulse triggers MMV 36, so that the MMV 36 provides a pulse of a predetermined duration to the base of transistor 26. The integration of the integrator can, therefore, proceed in steps of predetermined widths. The output voltage of the control amplifier 16, that is, of operational amplifier 33 then provides the required correction voltage to change the relative proportion of air and fuel of the air-fuel mixture being applied to the engine, for example by proportionate extension, or foreshortening of injection pulses of electronically controlled fuel injection systems, or by porportional change of a jet opening in the carburetor of an internal combustion engine.

A signal being applied from the threshold switch 14 to the integrating control amplifier 16 thus is periodically sampled or strobed, by the MMV 36, which has a fixed unstable time.

Referring again to FIG. 3, and specifically to the graph of FIG. e, if the speed of the engine increases, the horizontal portions of the curve of graph e will become less wide (representative of shorter time), and the average slope of the correction curve will increase, thus increasing the correction speed. If the speed of the engine should decrease, there will be longer gaps between the time when integration can proceed.

Various changes and modifications may be made within the scope of the inventive concept.

We claim:

1. Exhaust gas composition control system for internal combustion engines (10) having
   sensing means (12) sensing the composition of exhaust gases from the engine;
   an integral controller (30, 16) integrating the sensed signal with respect to time and providing an output control signal;
   means (11), mixing and proportioning the air and fuel being applied to the engine, said output control signal from the integral controller (13, 16) being connected and applied to said proportioning means and controlling said mixing and proportioning means to mix the air-fuel mass ratio which results in a predetermined exhaust gas composition as sensed by said sensor when the mixture is burned in the engine;
   the improvement wherein
   the integral controller integrates in steps, or recurring pulses, or cycles;
   and means (S) are provided deriving a pulsed signal representative of engine speed ($n$), said pulsed speed signal being applied to said integral controller (13, 16) to control the rate of cyclical recurrence of integration steps thereof in dependence on engine speed to effect integration at a time-average rate determined by said speed signal.

2. System according to claim 1, wherein said integral controller has a fixed integration rate.

3. System according to claim 1 wherein said integral controller has a predetermined integration rate;
   said pulsed speed signal is a pulsed on-off signal having an on-off ratio which is dependent on speed;
   and said integral controller is controlled by the ON pulses of said speed signal to effect integration at its predetermined rate during the ON-pulses only.

4. System according to claim 1 further comprising a threshold switch (14) connected to the output of the exhaust gas sensing means (12) and providing on-off sensing output signals when the sensed exhaust gas signal passes a pre-set limit;
   and a switching circuit (15) controlled by said engine speed signal ($n$), the on-off sensing signal being connected to said integral controller (16) through said switching circuit and being further modified by said switching circuit in accordance with the speed of the engine.

5. System according to claim 4 further comprising a monostable multivibrator (36) controlled by said engine speed signal ($n$) and providing output pulses at a rate representative of engine speed to form said pulsed speed signal;
   said output pulses being connected to said switching circuit (15) to interrupt the on-off sensing signal being applied to said integral controller (16) and command the integral controller to integrate the sensing signal only during occurrence of the output pulses from the monostable multivibrator (36).

6. System according to claim 5 wherein the integration rate of the integral controller (16) is fixed and the duration of integration per unit time is controlled by the number of output pulses per unit time.

7. System according to claim 5 wherein the mixing and proportioning means comprises a fuel injection system, said system including said means (S) deriving the engine speed representative signal to control the integration time of the integral controller (16) in accordance with the repetition rate of fuel injection events of the fuel injection system.

8. System according to claim 5 wherein said switching circuit (15) comprises a switching transistor (26) controlled by said monostable multivibrator (36);
   a pair of transistors (24, 25) connected to receive the on-off sensing output signal and respectively conductive during the ON, or OFF time, said switching transistor (26) being connected to said transistors (24, 25) of the pair to additionally control their conduction and inhibit conduction theref during the OFF time of the MMV (36).

9. System according to claim 8 wherein a voltage divider is provided having three resistors (29, 30, 31), and having two tap points formed between the junction of two respective resistors (29, 30; 30, 31), one terminal electrode of the transistors, each, of the pair being connected to a respective tap point of the voltage divider; and conduction of the transistors is controlled by a connection to the bases thereof, said connection including a first connection to the on-off sensing output signal and a second connection to said switching transistor (26).

10. Method of controlling the composition of the exhaust gases of an internal combustion engine which comprises the steps of mixing air and fuel to prepare an air-fuel mixture for application to the engine;

sensing engine speed;

sensing exhaust gas composition and deriving a sensing signal representative of said composition;

controlling the relative proportion of air and fuel being mixed as a function of (a) exhaust gas composition, (b) time, (c) engine speed;

wherein said controlling step comprises integrating the sensed signal in cyclically repetitive steps;

and controlling the recurrence rate of said repetitive steps, and hence the integration rate as a function of engine speed.

11. Method according to claim 10 wherein the step of integrating the sensed signal in cyclically repetitive steps comprises periodically integrating said sensed signal at a fixed integration rate.

12. Method according to claim 10 wherein the step of controlling the recurrence rate of said repetitive steps includes controlling the duration of interruption of integration, between steps, as a function of engine speed.

13. Method according to claim 10, wherein the step of controlling the recurrence rate of said repetitive steps comprises pulsing the sensing signal as a function of engine speed, and the integration step comprises integrating the pulsed signal.

14. Method according to claim 13 wherein the step of pulsing the sensing signal comprises periodically sampling the sensing signal at a rate representative of engine speed, and the integrating step comprises integrating the sampled signal, with respect to time, at a fixed rate, during said sampling periods.

* * * * *